(12) United States Patent  
Kunishige et al.

(10) Patent No.: US 7,978,256 B2  
(45) Date of Patent: Jul. 12, 2011

(54) IMAGING DEVICE HAVING MANUAL AND AUTO FOCUS AND A CONTROL METHOD FOR THE IMAGING DEVICE

(75) Inventors: Keiji Kunishige, Hachioji (JP); Satoshi Miyazaki, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 383 days.

(21) Appl. No.: 12/193,526

(22) Filed: Aug. 18, 2008

(65) Prior Publication Data

US 2009/0051807 A1 Feb. 26, 2009

(30) Foreign Application Priority Data

Aug. 22, 2007 (JP) .................................. 2007-216546

(51) Int. Cl.
*G03B 13/20* (2006.01)
*H04N 5/232* (2006.01)
(52) U.S. Cl. ........................................ 348/353; 348/350
(58) Field of Classification Search .................. 348/345, 348/346, 349, 350, 351, 353, 354; 396/89, 396/125, 137
See application file for complete search history.

(56) References Cited

U.S. PATENT DOCUMENTS

| 4,845,521 | A | * | 7/1989 | Akashi .......................... 396/137 |
| 5,532,883 | A | * | 7/1996 | Fukino .......................... 359/825 |
| 2005/0001924 | A1 | * | 1/2005 | Honda .......................... 348/348 |
| 2006/0210265 | A1 | * | 9/2006 | Adachi .......................... 396/374 |
| 2008/0036902 | A1 | * | 2/2008 | Tanaka .......................... 348/353 |

FOREIGN PATENT DOCUMENTS

| JP | 2001-281530 | 10/2001 |
| JP | 2004064713 A | * 2/2004 |

OTHER PUBLICATIONS

U.S. Appl. No. 12/174,901, filed Jul. 17, 2008, Kunishige, et al.
Second Office Action for Chinese Patent Application No. 200810145117.3, mailed Dec. 27, 2010 (5 pgs.) with translation (6 pgs.).

* cited by examiner

*Primary Examiner* — Jason Whipkey

(74) *Attorney, Agent, or Firm* — John C. Pokotylo; Straub & Pokotylo

(57) ABSTRACT

An imaging device, comprising a photographing lens having a manual focus mechanism, an imaging unit for receiving subject light flux, that has been made incident by the photographing lens, on an imaging surface, a display unit for carrying out a live view display operation using image data acquired by the imaging unit, a contrast AF unit for obtaining contrast information of the subject information from image data acquired by the imaging unit and guiding the photographing lens into a specified focus permissible range based on the contrast information, and a control unit for, when a manual focus operation is carried out after executing a focus adjustment operation using the contrast AF unit during the live view display, carrying out control so that there is a transition to a shooting operation without again executing the focus adjustment operation.

6 Claims, 12 Drawing Sheets

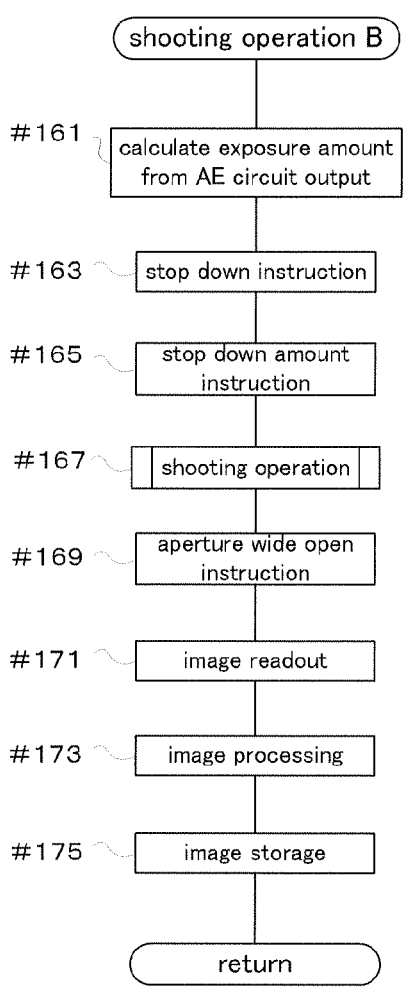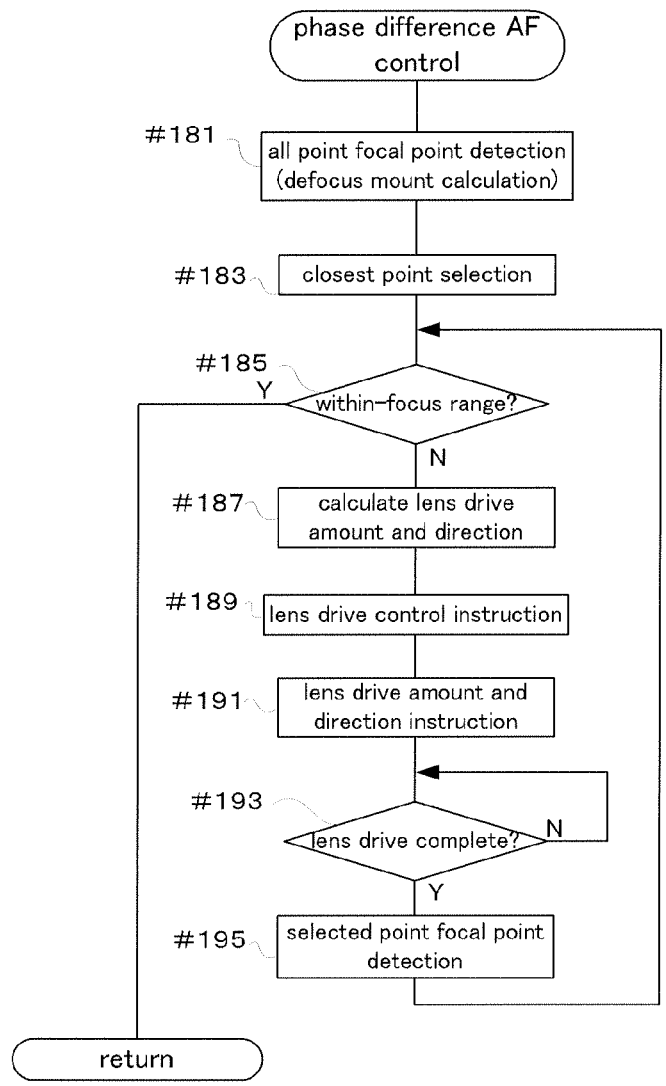
FIG. 8
FIG. 9

AF mode setting menu display screen

IMAGING DEVICE HAVING MANUAL AND AUTO FOCUS AND A CONTROL METHOD FOR THE IMAGING DEVICE

Benefit is claimed, under 35 U.S.C. §119, to the filing date of prior Japanese Patent Application No. 2007-filed on Aug. 22, 2007. This application is expressly incorporated herein by reference. The scope of the present invention is not limited to any requirements of the specific embodiments described in the application.

BACKGROUND OF THE INVENTION

1. Field of the Invention

The present invention relates to a digital camera having a live view display function, and in detail relates to an imaging device, having a so-called live view display function (also called an electronic viewfinder function) for displaying an image acquired by an image sensor on a display unit, capable of focusing a photographing lens using an image signal during this live view display, and to a control method for an imaging device.

2. Description of the Related Art

In a conventional digital camera, observation of a subject image is performed using an optical viewfinder. Recently however, digital camera are available on the market that do not have an optical viewfinder, or as well as the optical viewfinder have a live view display function for displaying an image that has been acquired by an image sensor using a display device such as a liquid crystal monitor for subject observation.

A digital camera having this type of live view display function is useful in making subject observation easy because a subject image acquired by the image sensor is displayed directly. However, in a digital single lens reflex camera, in order to carry out live view display a movable mirror that is arranged in the imaging optical path is temporarily retracted, which means that during live view it is no longer possible to use an AF (Auto Focus) mechanism that employs a conventional phase difference method where an amount of defocus of the photographing leans is detected using subject light flux that has been reflected by a sub-mirror attached to the moveable mirror.

For example, a digital single lens reflex camera that uses both contrast AF for performing AF by detecting contrast information based on an image signal from an image sensor, and the phase difference method AF, is disclosed in Japanese unexamined patent application No. 2001-281530 (laid-open Oct. 10, 2001). With this digital single lens reflex camera, focusing of the photographing lens is carried out using only contrast AF at the time of performing live view display.

SUMMARY OF THE INVENTION

The present invention has as its object to provide an imaging device that can perform focusing with a small time lag and with high precision in the case of imaging from a live view display function, and a control method for an imaging device.

According to the present invention, there is provided an imaging device, comprising: a photographing lens having a manual focus mechanism; an imaging unit for receiving subject light flux, that has been made incident by the photographing lens, on an imaging surface; a display unit for carrying out a live view display operation using image data acquired by the imaging unit; a contrast AF unit for obtaining contrast information of the subject information from image data acquired by the imaging unit and guiding the photographing lens into a specified focus permissible range based on the contrast information; and a control unit for, when a manual focus operation is carried out after executing a focus adjustment operation using the contrast AF unit during the live view display, carrying out control so that there is a transition to a shooting operation without again executing the focus adjustment operation.

BRIEF DESCRIPTION OF THE DRAWINGS

FIG. 8 is a flowchart showing a shooting operation B of one embodiment of the present invention.

FIG. 9 is a flowchart showing phase difference AF control of one embodiment of the present invention.

DETAILED DESCRIPTION OF THE PREFERRED EMBODIMENTS

Figure 1:
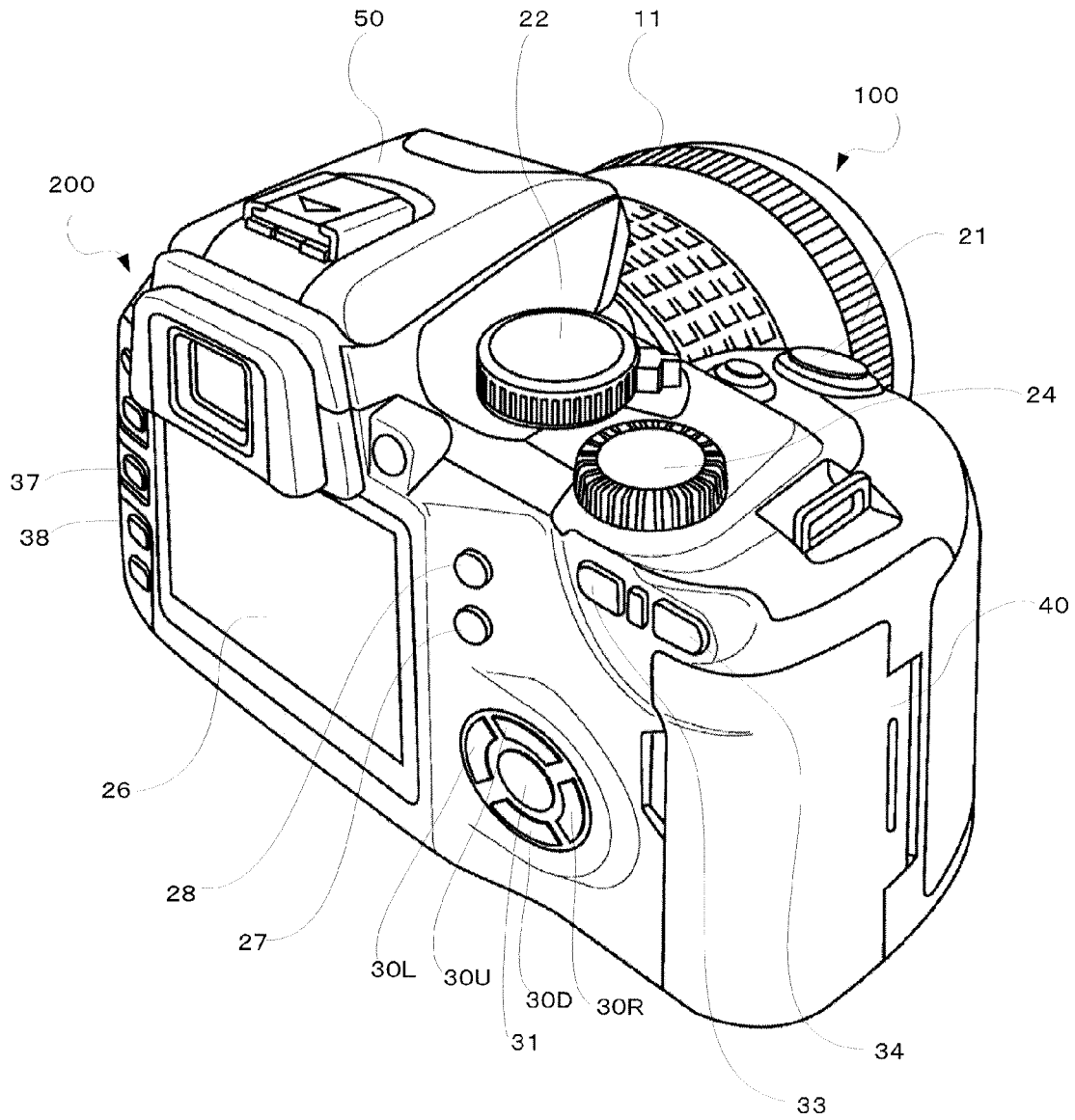
FIG. 1 is an external perspective drawing looking at a digital single lens reflex camera of one embodiment of the present invention from a rear surface.

In the following, one preferred embodiment using a digital single lens reflex camera adopting the present invention will be described using the drawings. FIG. 1 is an external perspective drawing of a digital single lens reflex camera relating to an embodiment of the present invention seen from a rear surface.

A release button 21, exposure mode dial 22, information setting dial 24 strobe 50 etc. are arranged on the upper surface of the camera body 200. The release button 21 has a first release switch that turns on if the photographer presses the button down halfway, and a second release switch that is turned on when the button is pressed down fully. By turning this first release switch (hereafter called 1R) on, the camera carries out exposure preparation operations such as focal point detection, focusing of the photographing lens, and light measurements for the subject brightness, and by turning the second switch (hereafter called 2R) on, a shooting operation is carried out to acquire image data for a subject image based on output of the image sensor 221 (refer to FIG. 2).

The exposure mode dial 22 is an operation member constructed capable of rotation, and by aligning a pictorial display or symbol representing an exposure mode provided on the exposure mode dial 22 with an index, it is possible to select respective exposure modes, such as full auto exposure mode (AUTO), program exposure mode (P), aperture priority exposure mode (A), shutter priority exposure mode (S), manual exposure mode (M), portrait exposure mode, landscape exposure mode, macro exposure mode, sports exposure mode or night scene exposure mode.

An information setting dial 24 is an operation member constructed capable of rotation, and it is possible to select desired setting values and modes etc. in an information display screen or the like by rotational operation of the information setting dial 24. The strobe 50 is a pop-up type supplemental lighting unit, and by operating an operating button, not shown, the strobe 50 pops up and is capable of irradiating light to a subject.

A liquid crystal monitor 26, continuous/single shot button 27, AF lock button 28, a cross-shaped button for up 30U, a cross-shaped button for down 30D, a cross-shaped button for right 30R, a cross-shaped button for left 30L, (if these buttons 30U, 30D, 30R and 30L are referred to collectively, it will be called a cross button 30), an OK button 31, a live view display button 33, an enlarge button 34, a menu button 37 and a playback button 38 are arranged on the rear surface of the camera body 200. The liquid crystal monitor 26 is a display unit for carrying out live view display, playback display of a subject images that have already been taken, and display of exposure information and menus. The display device is not limited to a liquid crystal display as long as it is possible to perform these display operations.

The continuous/single shot button 27 is an operation member switching between continuous shooting mode where pictures are taken continuously while the release button 21 is fully pressed down, and single shot mode where a single picture is taken if the release button 21 is pressed down fully. The AF lock button 28 is an operation member for fixing the focus point of the subject. Accordingly, if the subject of a picture to be taken is focused on, and the AF lock button 28 is operated in this state and the focus point fixed, it is possible take a picture with the subject still in focus, even if the composition is changed.

The cross-shaped key 30 is an operation member for instructing movement of a cursor in two dimensional directions, the X direction and Y direction, on the liquid crystal display monitor 26, and is also used in selection commands for subject image, when performing playback display of subject images that have been stored in the storage medium 277 (refer to FIG. 2) etc. Besides providing the four buttons for up, down left and right, it is also possible to replace with a touch switch. The OK button 31 is an operation member for confirming various items selected by the cross key button 30 and the control dial 24 etc.

The live view display button 33 is an operating button for switching to live view display from a display screen for information display etc., and switching from live view display to a display screen for information display etc. Live view display is a mode that display a subject image for viewing on the liquid crystal monitor 26 based on output of the image sensor 221 for subject image storage, and information display is a mode for displaying digital camera exposure information on the liquid crystal monitor 26. The enlargement button 34 is an operation member for enlarging display of part of a subject image on the liquid crystal monitor 26, and it is possible to change the enlargement position by operation of the above-described cross-shaped key 30.

The menu button 37 is an operation member for switching to menu mode in order to set various modes of the digital camera, and if menu mode is selected by operation of this button 37 a menu screen is displayed on the liquid crystal monitor 26. The menu screen is comprised of a multiple hierarchical structure, and various items are selected using the cross key 30 and selection is determined by operating the OK button 31. The playback button 38 is an operation button for instructing display of subject images, that have been stored after being taken, on the liquid crystal monitor 26. If a command for playback display is issued, image data of subjects stored in a compressed mode such as JPEG, for example, in SDRAM 267 and a storage medium 277, that will be described later, is expanded and displayed.

A storage medium housing cover 40 is attached to the side surface of the camera body 200. If the storage medium housing cover 40 is opened, a slot for fitting the storage medium 227 is provided inside, and the storage medium 227 can be loaded into or removed from the camera body 200.

Also, an interchangeable lens 100 is fitted to the camera body, and a manual focus ring (M focus ring) 11 is provided on the interchangeable lens 100. This manual focus ring 11 is a ring that is operated by being rotated, and if it is operated it is possible to perform manual focusing (manual focus adjustment) of the photographing optical system 100 using power focus.

Figure 2:
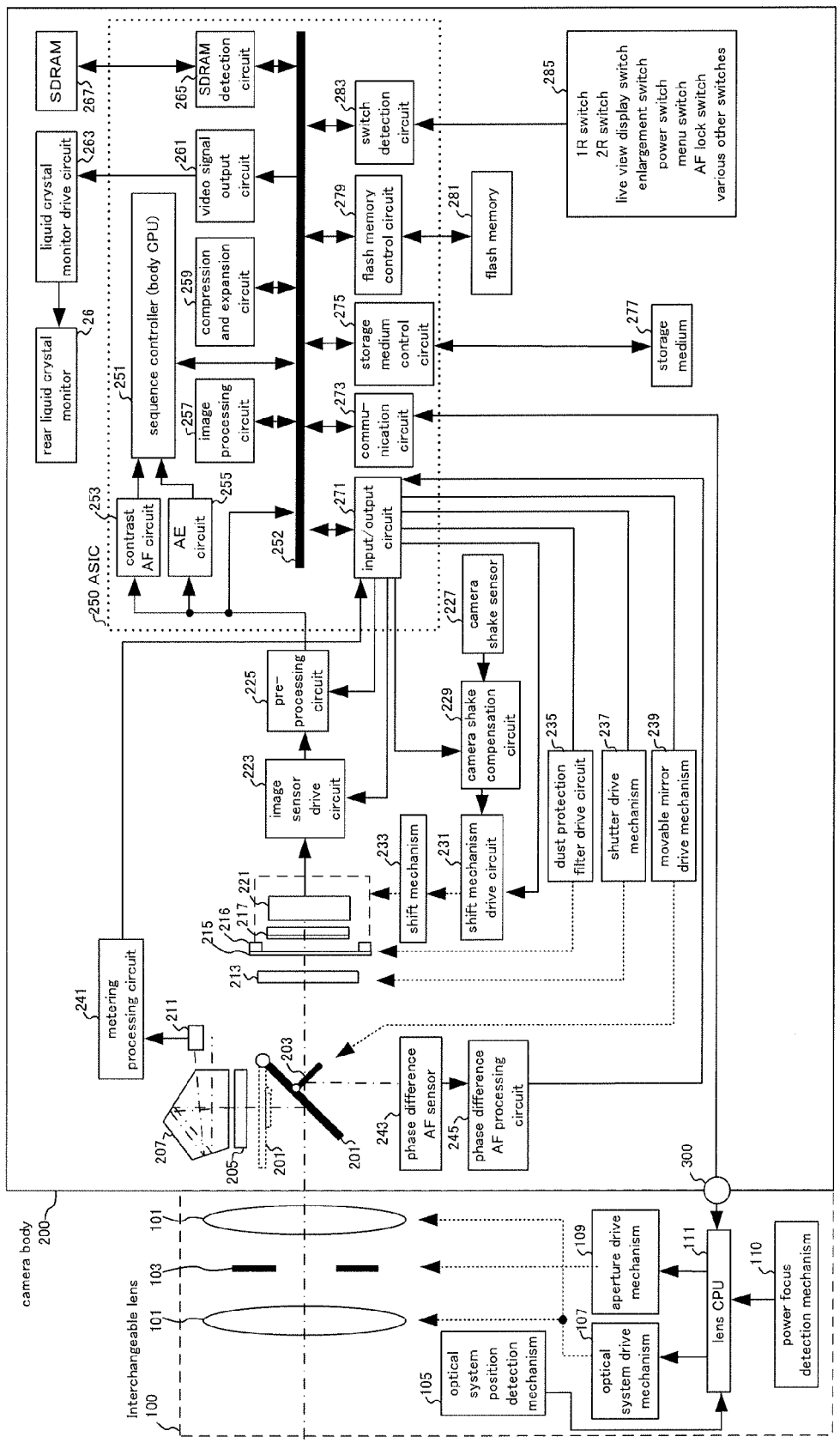
FIG. 2 is a block diagram showing the overall structure of a digital single lens reflex camera of one embodiment adopting the present invention.

Next, the overall structure principally involved in the electrical systems of the digital single lens reflex camera will be described using FIG. 2. The digital single lens reflex camera relating to this embodiment comprises an interchangeable lens 100 and a camera body 200. With this embodiment, the interchangeable lens 100 and the camera body 200 are constructed as separate bodies, electrically connected by means of a communication contact 300, but it is also possible to integrally construct the interchangeable lens 100 and the camera body 200. A circuit block for the built-in strobe 50 is omitted from FIG. 2.

A photographing optical system 101 for focusing and focal length adjustment, and an aperture 103 for adjusting aperture value, are arranged inside the interchangeable lens 100. The photographing optical system 101 is driven by an optical system drive mechanism 107, while the aperture 103 is driven by the aperture drive mechanism 109. Focal length and focus position of the photographing optical system that has been driven by the optical system drive mechanism 107 are detected by an optical system position detection mechanism 105. A power focus detection mechanism 106 for detecting rotation direction and rotation amount of the M focus ring 11 is also arranged.

The lens drive mechanism 107, the aperture drive mechanism 109, the optical system position detection mechanism 105 and the power focus detection mechanism 106 are respectively connected to a lens CPU 111, and this lens CPU 111 is connected to the camera body 200 by means of the communication contact 300. The lens CPU 111 performs control inside of the interchangeable lens 100, controls the optical system drive mechanism 107 to perform focusing and zoom operations, and controls an aperture value by controlling the aperture drive mechanism 109. Also, the lens CPU 111 transmits the focal length and focus position information detected by the optical system position detection mechanism 105 to the camera body 200.

Further, the lens CPU 111 controls the optical system drive mechanism 107, based on the rotation direction and rotation amount of the M focus ring 11 detected by the power focus detection mechanism 106, to carry out manual focus adjustment. As will be described later, the lens CPU 111 also transmits the fact that the M focus ring has been operated to the camera body 200. Within this embodiment, manual focus adjustment is carried out using power focus, but it is also perfectly acceptable to carry out manual focus adjustment using drive force supplied by the photographer themselves.

Inside the camera body 200, a rotatable moving mirror 201 is provided moving between a position inclined by 45 degrees with respect to the lens optical axis for reflecting a subject image to a viewfinder optical system (lowered position, subject image viewing position), and a raised up position for guiding the subject image to the image sensor 221 (raised position, retracted position). A focusing screen 205 for image forming the subject image is arranged above the movable mirror, and a pentaprism 207 for lateral inversion of the subject image is arranged above this focusing screen 205.

An ocular lens (not shown) for viewing the subject image is arranged at an outgoing side of this pentaprism 207 (the right side in FIG. 2), and a photosensor 211 is arranged next to the ocular lens at a position that does not obstruct viewing of the subject image. This photosensor 211 is connected to a photometry processing circuit 241, and output of the photosensor 211 is subjected to processing such as amplification processing and analog-digital conversion by this photometry processing circuit 241.

A half mirror is constructed close to the middle of the movable mirror 201, and a sub-mirror 203 for reflecting the subject image that has passed through the half mirror to a lower section of the camera body 200 is provided on a rear surface of the movable mirror 201. This sub mirror 203 is capable of rotation with respect to the moving mirror 201, and when the moving mirror 201 is raised up (position shown by dotted lines in FIG. 2) the sub mirror 203 rotates to a position covering the half mirror part, while when the moving mirror 201 is in a subject image viewing position (lowered position) the sub-mirror 203 is at a position opened with respect to the moving mirror 201, as shown in the drawing.

This movable mirror 201 is driven by a movable mirror drive mechanism 239. Also, a phase difference AF sensor 243 is arranged below the sub-mirror 203, and output of this phase difference AF sensor 243 is connected to a phase difference AF processing circuit 245. The phase difference AF sensor 243 measures defocus amount for a subject image formed using the photographing optical system 101, and is constructed of a well-known phase difference AF optical system for separating peripheral light of the photographing optical system 101 into two light fluxes, and a pair of sensors. Also, the phase difference AF sensor 243 is capable of detecting respective focus points for a plurality of points within an exposure screen.

A focal plane type shutter 213 for exposure time control is arranged behind the movable mirror 201, and drive control for this shutter 213 is performed by a shutter drive mechanism 237. An image sensor 221 is arranged behind the shutter 213, and a subject image formed by the photographing optical system 101 is photoelectrically converted into electrical signals. It goes without saying that it is possible to use CCD (Charge Coupled Devices), or a two-dimensional imaging element such as CMOS (Complementary Metal Oxide Semiconductor) as the image sensor 211.

The image sensor 221 is connected to an image sensor drive circuit 223, and readout of image signals from the image sensor 221 etc. is performed by this image sensor drive circuit 223. The image sensor drive circuit 223 is connected to a pre-processing circuit 225, and the pre-processing circuit 225 performs pixel thinning processing for live view display, and pre-processing for image processing such as cropping processing for enlarged display.

A dust protection filter 215, piezoelectric element 216, and infrared cut filter/low pass filter 217 are arranged between the shutter 213 and the image sensor 221. The piezoelectric element 216 is provided around the edge of the dust protection filter, and this piezoelectric element 216 is vibrated with ultrasonic waves by a dust protection filter drive circuit 235. Dust that has become adhered to the dust protection filter 215 is removed by the vibration waves generated in the piezoelectric element 216.

The infrared cut/low pass filter 217 is an optical filter for removing an infrared component and a high frequency component from subject light flux. The dust protection filter 215, piezoelectric element 216, infrared cut/low pass filter 217 and image sensor 221 are formed integrated in an airtight manner so that that dust does not infiltrate. The integrated image sensor 221 etc. can be respectively driven in the X-axis direction and Y-axis direction of the image plane of the image sensor 221 by a shift mechanism 233.

A hand-shake sensor 227 is a sensor for detecting vibration caused by hand vibration applied to the camera body 200 etc., and output of this sensor is connected to an image stabilization circuit 229. The image stabilization circuit 229 generates image stabilization signals for removing vibrations such as hand-shake, and output of the image stabilization circuit 229 is connected to a shift mechanism drive circuit 231. The shift mechanism drive circuit 231 receives input of an image stabilization signal, and drives the shift mechanism 233 based on this signal. Using the shift mechanism 233 the image sensor 221 etc. are driven so as to negate vibrations such as hand-shake that are applied to the camera body 200, to perform vibration prevention.

The pre-processing circuit 225 is connected to data bus 252 inside an ASIC (Application Specific Integrated Circuit) 250. A sequence controller (hereafter referred to as a body CPU) 251, image processing circuit 257, compression and expansion circuit 259, video signal output circuit 261, SDRAM control circuit 265, input/output circuit 271, communication circuit 273, storage medium control circuit 275, flash memory control circuit 279 and switch sensing circuit 283 are connected to this data bus 252.

The body CPU 251 that is connected to the data bus 252 controls operation of this digital single lens reflex camera. A contrast AF circuit 253 and an AE circuit 255 are connected in parallel between the pre-processing circuit 225 and the body CPU 251. The contrast AF circuit 253 extracts a high frequency component based on an image signal output from the pre-processing circuit 225, and outputs contrast information to the body CPU 251 based on this high frequency information. The AE circuit 255 outputs photometry information according to subject brightness to the body CPU 251 based on the image signal output from the pre-processing circuit 225.

The image processing circuit 257 is connected to the data bus 252 and carries out various image processing such as digital amplification of digital image data (digital gain adjustment processing), color correction, gamma ($\gamma$) correction, and image generation for live view display etc. Also, the compression and expansion circuit 259 is a circuit for compressing image data stored in the SDRAM 267 using a compression system such as JPEG, TIFF etc. The image compression is not limited to JPEG and TIFF, and it is also possible to apply other compression systems.

The video signal output circuit 261 is connected to a liquid crystal monitor 26 via a liquid crystal monitor drive circuit 263. The video signal output section 261 converts image data stored in the SDRAM 267 or the storage medium 277 into video signals for display on the liquid crystal monitor 26. The liquid crystal monitor 26 is arranged on the rear surface of the camera body 200 as shown in FIG. 1, but as long as it is in a position that can be seen by the photographer it is not limited to the rear surface, and also is not limited to a liquid crystal display and can be another display device.

The SDRAM 267 is connected via the SDRAM control circuit 265 to the data bus 261, and this SDRAM 267 acts as a buffer memory for temporarily storing image data that has been subjected to image processing by the image processing circuit 257 or image data that has been compressed by the compression and expansion circuit 259.

The input/output circuit 271 connected to the above described image sensor drive circuit 223, pre-processing circuit 225, image stabilization circuit 229, shift mechanism drive circuit 231, dust protection filter drive circuit 235, shutter drive mechanism 237, movable mirror drive mechanism 239, photometry processing circuit 241, and phase difference AF processing circuit 245 controls input and output of data to various circuits, such as the body CPU 251 via the data bus 252.

The communication circuit 273 that is connected to the lens CPU 111 via the communication contact 300 is also connected to the data bus 252, and carries out data exchange with the body CPU 251 etc. and communication for control commands. The storage medium control circuit 275 connected to the data bus 252 is connected to the storage medium 277, and performs control of storing image data etc. to this storage medium 277 and reading of image data etc.

The storage medium 277 is constructed so that any rewritable storage medium, such as xD picture card (registered trademark), Compact Flash (registered trademark), SD memory card (registered trademark) or memory stick (registered trademark) can be fitted, and is removably inserted into the camera body 200. Besides, it is also possible to have a configuration where it is possible to connect to a hard disc via a communication connection point.

The flash memory control circuit 279 is connected to a flash memory 281, and this flash memory 281 stores programs for controlling operation of the digital single lens reflex camera, and the body CPU 251 performs control of the digital single lens reflex camera in accordance with the programs stored in the flash memory 281. Incidentally, the flash memory 281 is an electrically rewritable non-volatile memory.

Various switches 285, including a 1R switch for detecting a first stroke (half pressing) of the shutter release button 21, a 2R switch for detecting a second stroke (full pressing), and a live view display switch that is turned on by operation of the live view display button 33, are connected to the data bus 252 via a switch detection circuit 283. As the various switches 285 there are also an enlargement switch linking to an enlargement button 34, a power switch, a menu switch linking to a menu button 37, an AF lock switch linking to an AF lock button 28, a continuous shooting/single shot switch linking to a continuous shooting/single shot button 27, and various other switches linking to other operation members.

Figure 3:
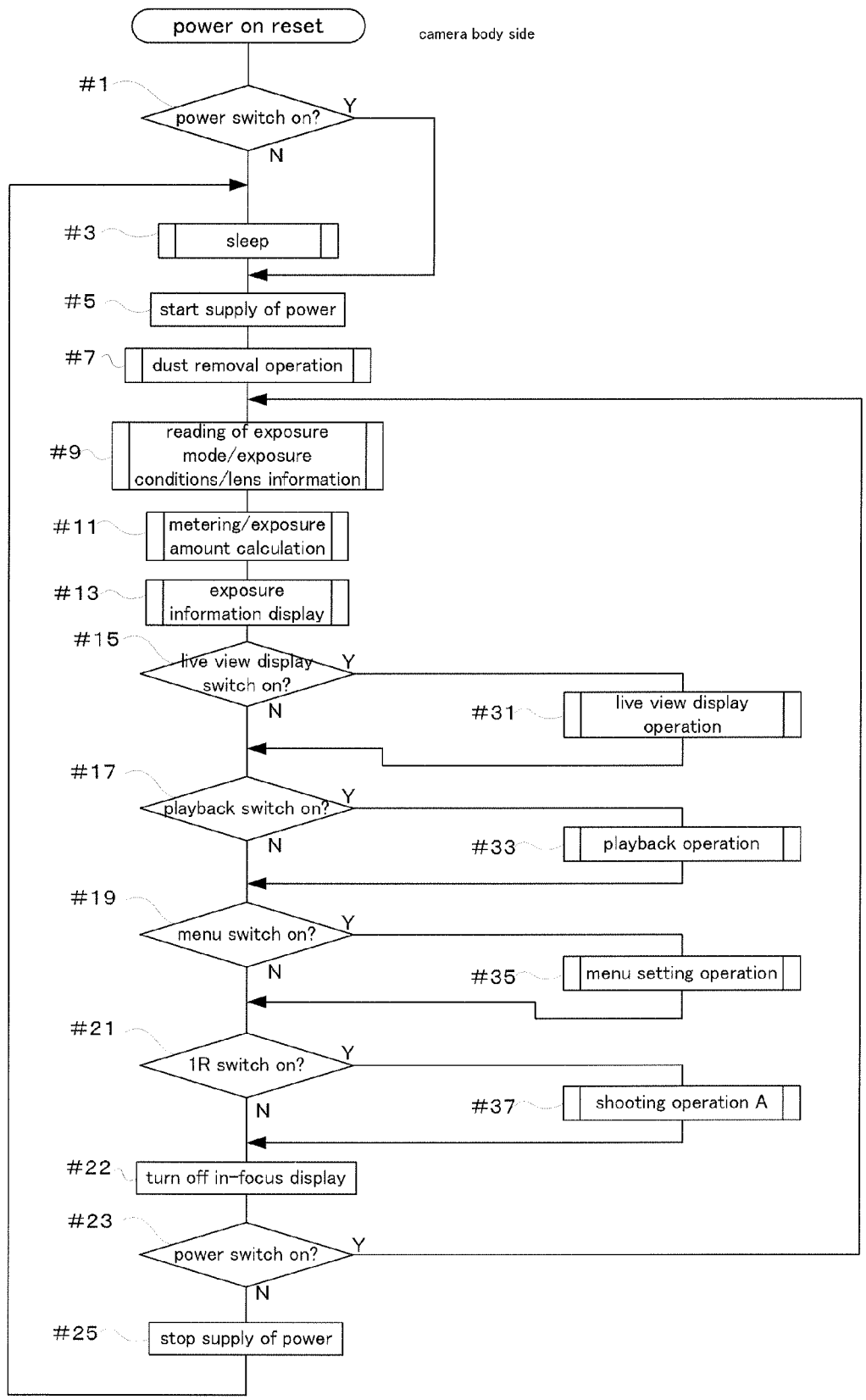
FIG. 3 is a flowchart showing a power-on reset operation, in the camera body, of one embodiment of the present invention.

Next, operation of the digital camera of one embodiment of the present invention will be described using the flowcharts shown in FIG. 3 to FIG. 11. FIG. 3 shows a power on reset operation performed by the body CPU 251 at the camera body 200 side. If a battery is fitted into the camera body 200, this flow of operations starts, and the first thing that happens is that it is determined whether the power switch of the camera body 200 is on (#1).

When the result of determination is that the power switch is off, a sleep state, which is a low power consumption state, is entered (#3). In this sleep state, interrupt processing is carried out only when the power switch is turned on, and processing for power switch on is carried out in steps #5 and after. Until the power switch is turned on, operations other than power switch interrupt processing are suspended, and consumption of the power supply battery is prevented.

In the event that the power switch was on in step #1, or the sleep state of step #3 is left, supply of power commences (#5). Next, the dust removal operation for the dust protection filter is carried out (#7). This is an operation to apply drive voltage to the piezoelectric element 216 attached to the dust protection filter 215 from the dust protection filter drive circuit 235, and remove dust using ultrasonic vibration waves.

Next, if there is information such as exposure mode set by the exposure mode dial 22 etc., ISO speed, shutter speed set manually, or aperture value, reading in of these exposure conditions and lens information is carried out (#9). Reading of lens information is the reading of lens characteristic information, such as maximum aperture, type of interchangeable lens 100, focal length information, and a lens identification signal, from the lens CPU 111 by means of the communication circuit 273.

Next, photometry and exposure value calculation are carried out (#11). In this step, subject brightness is then measured by the photosensor 211, exposure amount is calculated, and exposure control values such as shutter speed and aperture value are calculated in accordance with exposure mode and exposure conditions, using this exposure value. After that, the exposure information is displayed on the liquid crystal monitor 26 (#13). As exposure information, there are exposure mode and exposure conditions read in step #9 and exposure control values for shutter speed and aperture value calculated in #11.

It is then determined whether or not the live view display switch is on (#15). As described previously, if the photographer is observing a subject image in live view display, the live view display button 33 is operated. If the result of determination is that the live view display switch is on, a subroutine for live view display operation is executed (#31). This live view display operation will be described later using FIG. 4 to FIG. 6.

If the result of determination in #15 is that the live view display switch is not on, it is determined whether or not the playback switch is on (#17). Playback mode is a mode for reading out still images stored in the storage medium 277 and displaying them on the liquid crystal monitor 26, when the playback button 38 has been operated. If the result of determination is that the playback switch is on, a playback operation is executed (#33).

If the result of determination in #17 is that the playback switch is not on, it is determined whether or not the menu switch is on (#19). In this step, it is determined whether or not the menu button 37 has been operated and the menu mode has been set. If the result of determination is that the menu switch is on, menu display is performed on the liquid crystal monitor 26, and a menu setting operation is carried out (#35). Various setting operations such as AF mode, white balance, ISO speed setting, drive mode setting etc. can be carried out by the menu setting operation.

If the determination result in step #19 is that the menu switch is not on, it is next determined whether or not the release button 21 has been pressed down halfway, that is, whether or not the 1R switch is on (#21). If the result of determination is that the 1R switch is on, an exposure operation A sub-routine is executed to carry out exposure preparation and exposure (#37). This sub-routine will be described in detail later using FIG. 7.

Figure 13:
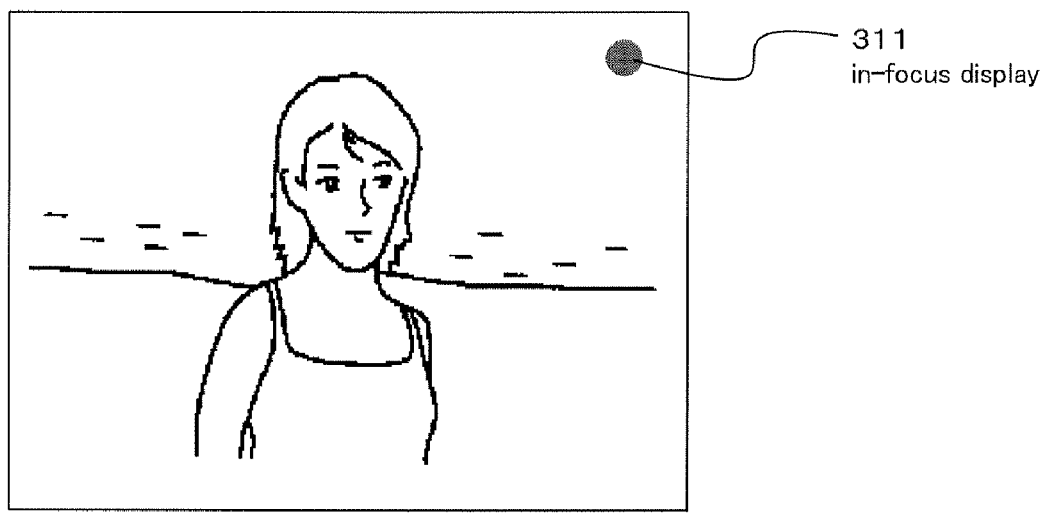
FIG. 13 is a diagram showing focus completion display for one embodiment of the present invention.

However, if the result of determination in step #21 is that the 1R switch is not on, in-focus display is turned off (#22). As will be described later, if a focused state is reached using contrast AF and a subject is focused on, a in-focus display 311 as shown in FIG. 13 is displayed (#235 in FIG. 10), and so if this in-focus display is active it is turned off.

Then, as in step #1, it is determined whether or not the power switch is on (#23). If the result of determination is that the power switch is on, processing returns to step #9 and the operations described above are repeated. On the other hand, if the power switch is not on, supply of power is stopped (#25), and processing returns to step #3 where the previously described sleep state is entered.

Figure 4:
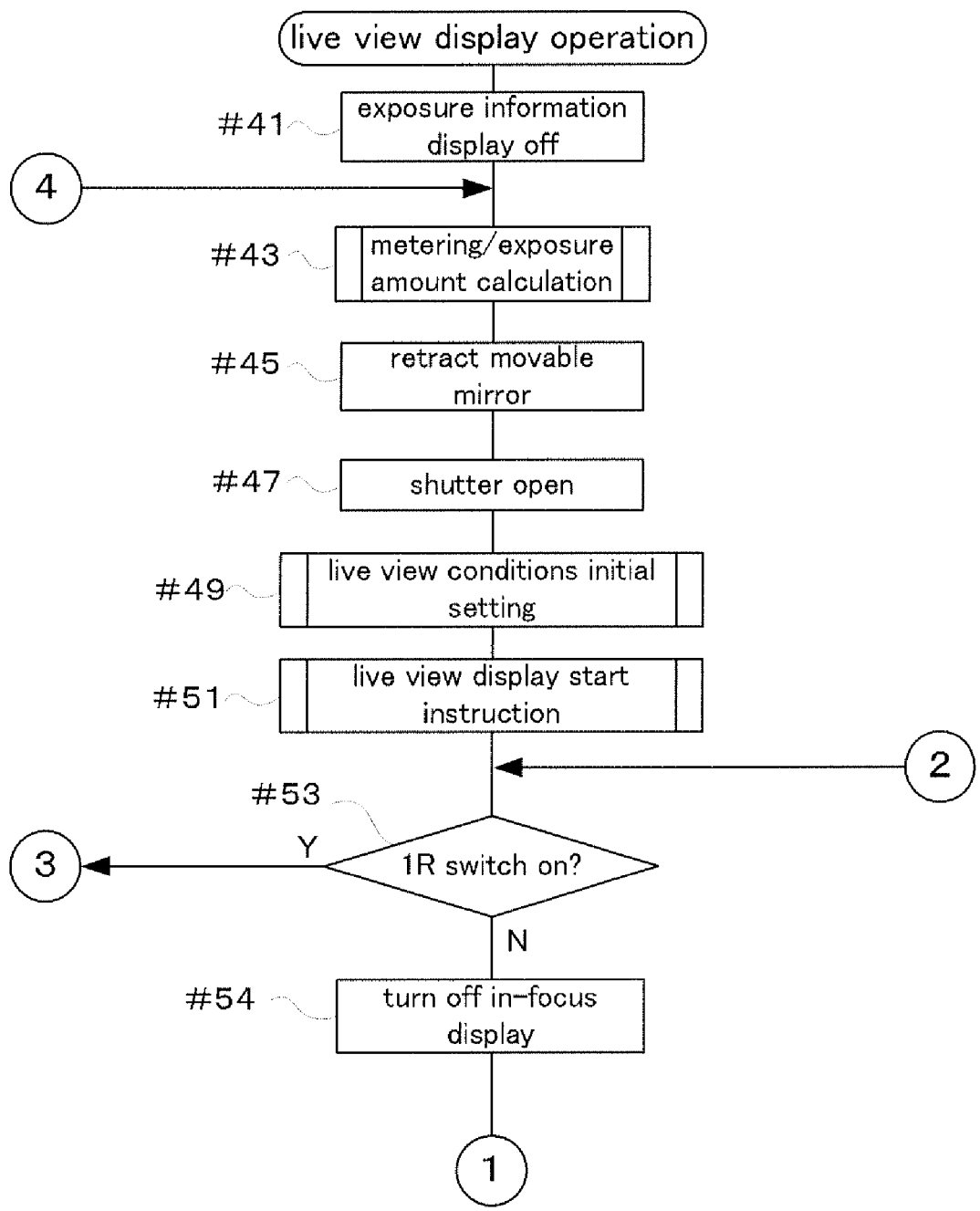
FIG. 4 is a flowchart showing a live view display operation of one embodiment of the present invention.
Figure 5:
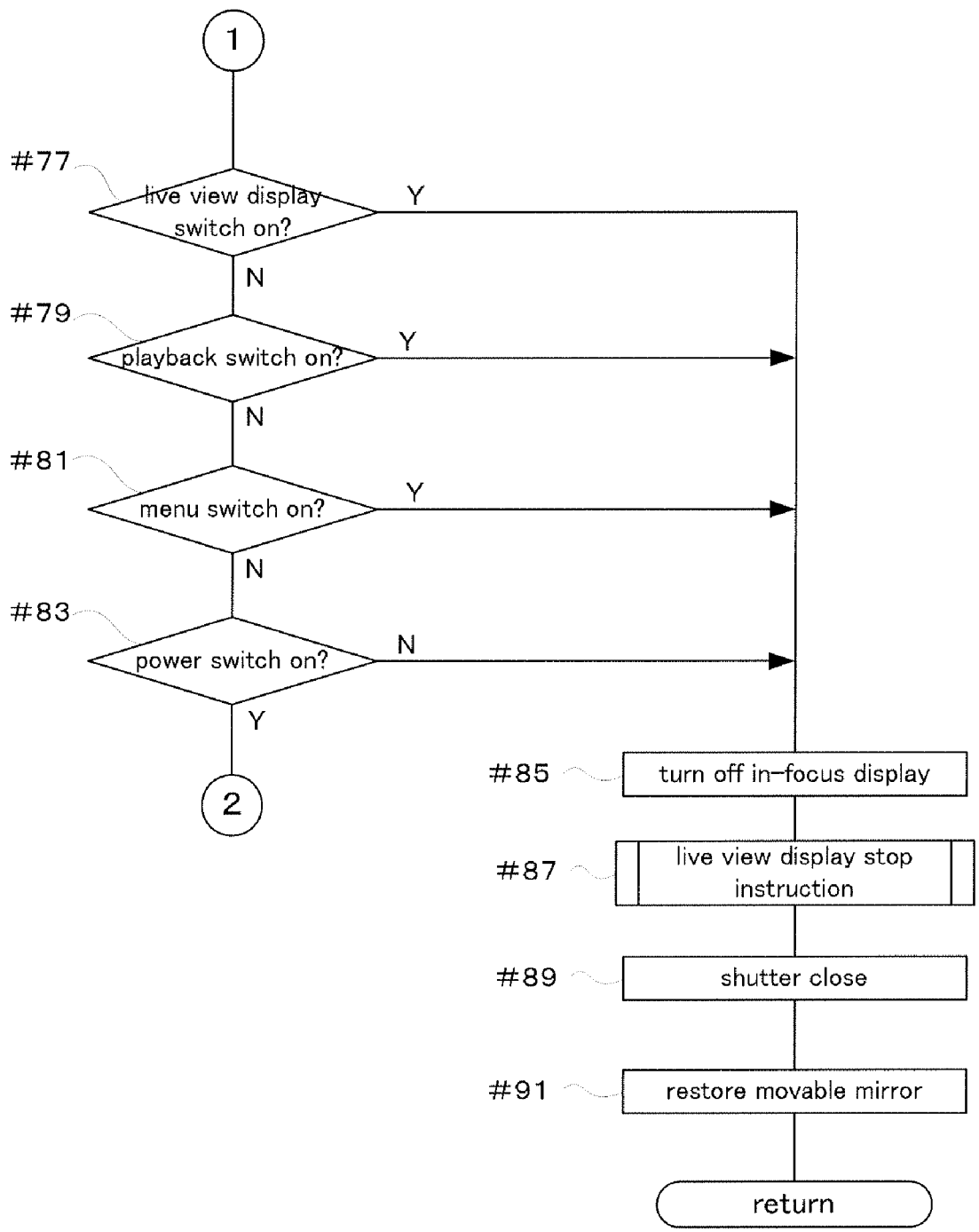
FIG. 5 is a flowchart showing a live view display operation of one embodiment of the present invention.

Next, the live view display operation of step #31 will be described using FIG. 4 to FIG. 6. If this subroutine is entered, first of all exposure information display is turned off (#41). In step #13, exposure information is displayed on the liquid crystal monitor 26, but in this step display of this exposure information is stopped in order to display live view on the liquid crystal monitor 26. Then, similarly to step #11, photometry and exposure amount calculation are performed (#43).

Next, the movable mirror 201 is retracted from the optical axis of the photographing optical system 101(#45), and the shutter 213 is opened (#47). As a result of these operations, a subject image is formed on the image sensor 221 by the photographing optical system 101. Next, live view condition initial setting is carried out (#49). In this step, in order to carry out condition setting for electronic shutter speed and sensitivity when driving the image sensor 221, calculation and setting is carried out in order to display an image having an appropriate brightness on the liquid crystal monitor 26 using results of calculation for light measurement and exposure amount obtained in step #43.

Next, start of live view display is instructed (#51). Specifically, the live view display is instructed to the image sensor 221 and the image processing circuit 257, and image data acquired by the image sensor 221 is displayed as a moving image on the liquid crystal monitor 26. The photographer can then decide on photo composition based on this live view display. The electronic shutter speed and ISO sensitivity etc. are controlled so that screen brightness of the liquid crystal monitor 26 stays constant during live view display.

If live view display is started, it is next determined whether or not the release button 21 has been pressed down halfway, that is, whether or not the 1R switch is on (#53). If the result of determination is that the 1R switch is not on, then similarly to step #22, if the in-focus display is active it is turned off (#54).

It is next determined whether or not the live view display switch that links to the live view display button 33 is on (#77). If the live view display button 33 is pressed once, the live view display mode is entered, and if it is pressed again the live view display mode is released. If the result of determination is step #77 is that the live view display switch is on, then the live view display mode is terminated in step #85 and after.

If the result of determination in step #77 is that the live view display switch is not on, it is determined whether or not the playback switch that links to the playback button 38 is on (#79). In order to carry out playback display of image data that is stored in the storage medium 277 on the liquid crystal monitor 26, it is necessary to terminate the live view display. If the result of determination in step #79 is that the live view display switch is on, then the live view display mode is terminated in step #85 and after.

If the result of determination in step #79 is that the playback switch is not on, it is determined whether or not the menu switch that links to the menu button 37 is on (#81). In order to carry out menu display on the liquid crystal monitor 26, it is necessary to terminate the live view display. If the result of determination is step #81 is that the live view display switch is on, then the live view display mode is terminated in step #85 and after.

If the result of determination in #81 is that the menu switch is not on, it is determined whether or not the power switch is on (#83). If the result of determination is that the power switch is off, then in order to carry out power off processing live view display mode is terminated in step #85 and after. If the result of determination in step #83 is that the power switch is on, processing returns to step #53 and the operations described above are repeated.

If a transition is made to step #85 in order to terminate live view display, first of all, as in step #22, in-focus display is turned off (#85). Next, an instruction to stop live view display is issued to the pre-processing circuit 225 and the image processing circuit 257 etc. (#87). After that, instruction of a shutter close operation is issued to the shutter 213 (#89), the movable mirror 201 is subjected to a return operation (moved to the lowered position) (#91), and the original routine is returned to.

Figure 6:
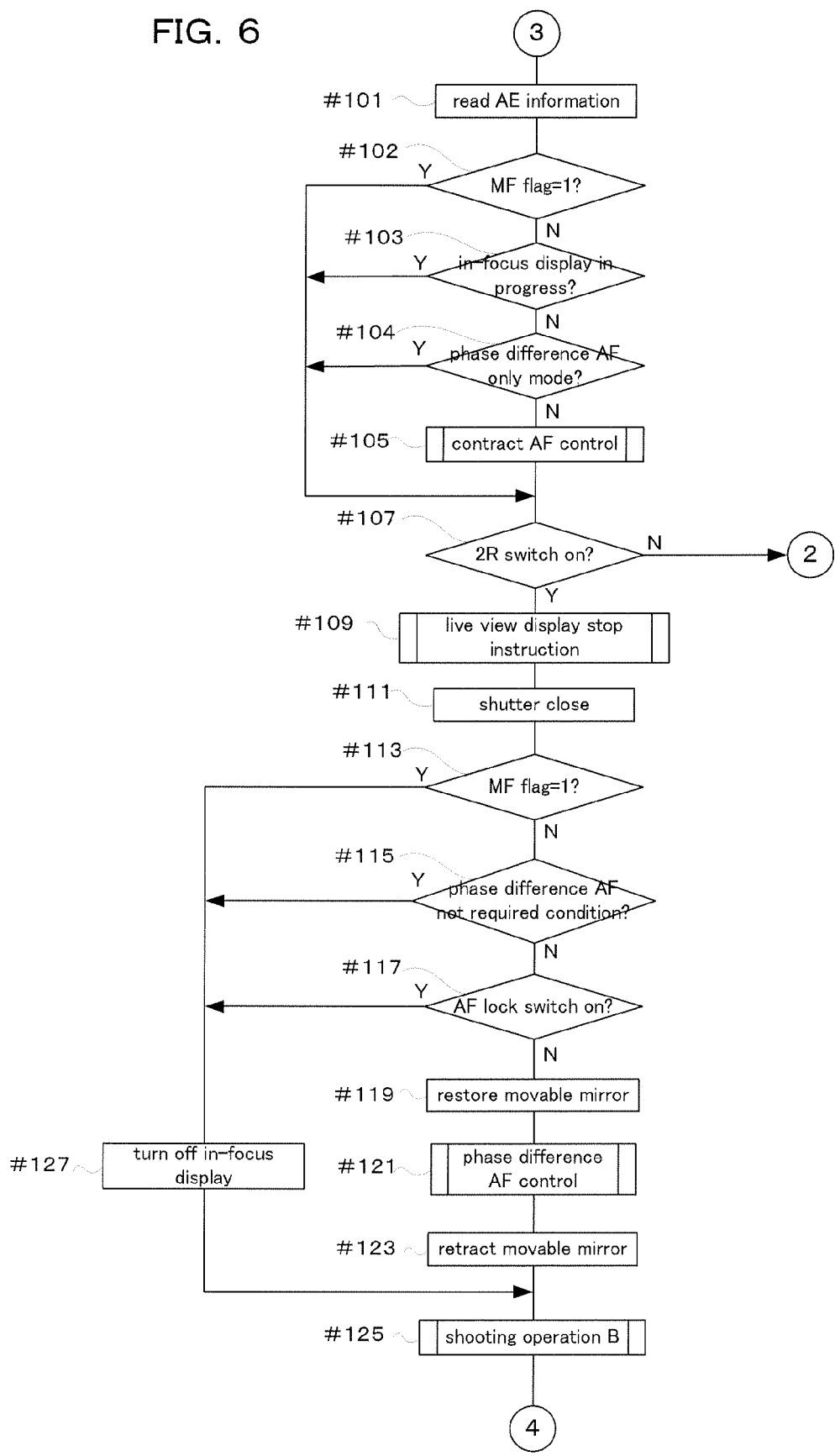
FIG. 6 is a flowchart showing a live view display operation of one embodiment of the present invention.

If the result of determination in step #53 (FIG. 4) is that the 1R switch is on, reading of AE information is carried out (#101 in FIG. 6). Photometry in step #43 is with the movable mirror 201 in the lowered position, which means that it is possible to perform photometry using the photosensor 211, but in this step the movable mirror 201 is retracted (in the raised up position) and it is not possible to perform photometry using the photosensor 211. AE information is therefore obtained based on output of the AE circuit 255.

It is next determined whether or an MF flag is 1 (#102). As will be described later, if a tentative focused state has been reached using contrast AF control, it becomes possible to perform fine adjustment using power focus according to the rotation direction and rotation amount of the M focus ring 11. If drive using power focus is completed, the MF flag is then set to 1. Specifically, after a focused state has been achieved using contrast AF control and power focus drive is complete, MF=1 is set (#335 in FIG. 11). If the MF flag is set to 1, then since a focus point has been reached using contrast AF further contrast AF control is not required and step #105 is skipped.

If the result of determination in step #102 is that the MF flag is not 1, it is determined whether or not in-focus display is in progress (#103). If the photographing optical system 101 achieves a focus state using contrast AF, the in-focus display is activated (#235 in FIG. 10). After reaching the focus state, in step #105, if the photographing optical system 101 is again driven using contrast AF operating precision is not good, and so in the event that the focus state has been reached step #105 is skipped.

Figure 12:
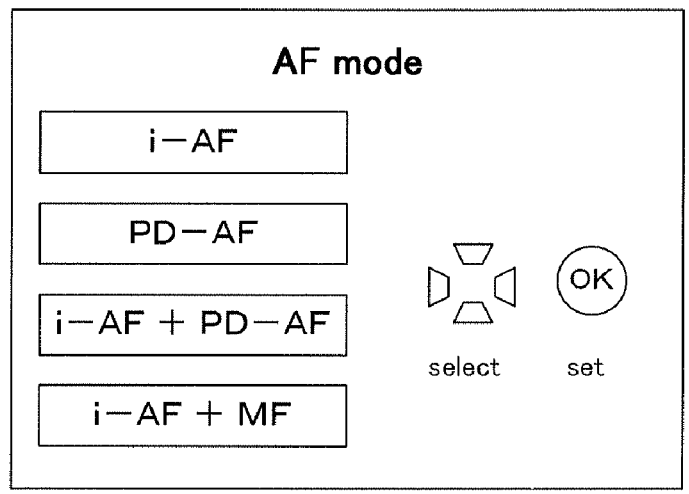
FIG. 12 is a drawing showing an AF mode setting menu display screen of one embodiment of the present invention.

If the result of determination in step #103 is that the in-focus display is not being performed, it is next determined whether or not it is phase difference AF only mode (#104). In the selection screen for AF mode during a menu setting operation of step #35 (refer to FIG. 12), it is possible to carry out selection from the following four types of AF mode.

Specifically, within this embodiment, it is possible to select either of i-AF mode for carrying out contrast AF only based on output of the image sensor 221, PD-AF mode for carrying out only phase difference AF based on output of the phase difference AF sensor 243, i-AF+PD-AF mode with which it is possible to carry out both contrast AF and phase difference AF, and i-AF+MF with which it is possible to carry out both contrast AF and manual focus adjustment (MF).

If the result of determination in step #104 is phase difference AF only mode, or if the result of determination in step #103 is that the in-focus display is active, or if the result of determination in step #102 is that the MF flag is 1, processing jumps to step #107, while if the result of determination in step #104 is not phase difference AF only mode contrast AF control is carried out (#105).

In this contrast AF control, control is performed so that the photographing optical system 101 reaches an in focus state based on contrast information from the contrast AF circuit 253. This phase contrast AF control will be described in detail later using FIG. 10.

Next it is determined if the release button 21 has been pressed down fully, that is, if the 2R switch is on (#107). If the result of determination is that the 2R switch is not on, processing returns to step #53 and the steps described above are repeated. On the other hand, if the 2R switch is on, an exposure operation is executed in steps #109 and after.

If the exposure operation is entered, first live view display is stopped (#109). Next, the shutter 213 is closed (#111). During live view display, the shutter 213 is opened, and a subject image is displayed on the liquid crystal monitor 26 based on output of the image sensor 221, but the shutter 213 is temporarily closed in order to enter the exposure operation.

It is then determined whether or not the MF flag is 1 (#113). If the M focus ring 11 is operated in the focused state, the MF flag is set to 1 (#335 in FIG. 11). In this state automatic focus adjustment using phase difference AF is not required, and so step #121 is skipped.

Next it is determined whether or not a phase difference AF not required condition is specified (#115). As a phase difference AF not required condition, there are cases of (1) focal distance of the photographing lens is at a wider angle side that a specified value, (2) aperture value is a specified value or greater (aperture opening diameter is small), and (3) subject depth of field is wider than a focus permissible range due to the fact that the subject distance is to a longer distance side than a specified distance. Specifically, in the event that these conditions are satisfied, it can be considered that sufficient focus precision will be obtained even with contrast AF control only, and so it is not necessary to further carry out high precision phase difference AF.

If a phase difference AF not required condition is not satisfied in step #115 it is determined whether or not the AF lock switch that links to the AF lock button 28 is on (#117). If the result of determination is that the AF lock switch is not on, phase difference AF is carried out in step #119 and after. Specifically, if the results of determination in all of steps #113, #115 and #117 pass through N, high precision AF is carried out using phase difference AF.

In order to carry out phase difference AF, first of all the movable mirror 201 is restored, and inserted into the optical path of the photographing optical system 101 (#119). In this way, subject light flux for phase difference AF is guided to the phase difference AF sensor 243. Next, phase difference AF control is carried out (#121). In this step, defocus direction and defocus amount of the photographing optical system 101 are detected using well-known phase difference AF, drive control for the optical system drive mechanism 107 is carried out based on this defocus direction and defocus amount, and focusing of the photographing optical system 101 is carried out. Details will be described later using FIG. 9.

If the phase difference AF control is finished, the movable mirror 201 is moved to the raised up position, that is, retracted (#123). As a result, subject light flux that has passed through the photographing optical system 101 is again guided to the image sensor 221, and an image is formed on the image sensor 221.

If the result of decision in step #113 passes through Y, then a focused state has been reached using manual focus adjustment and so it is no longer necessary to carry out AF using phase difference AF, and if the result of determination in step #115 passes through Y, then there is no longer any need to perform high precision AF using phase difference AF, and if the result of determination in step #117 is that the AF lock switch is on then the photographer has already determined the focus position, and so the exposure operation is entered directly so that there will be no unintentional changing of the focus position due to phase difference AF, but before that the in-focus display is turned off (#127).

If steps #123 and #127 are completed, then an exposure operation B is next carried out to acquire and store image data based on the subject image (#125). This exposure operation B will be described later using FIG. 8. If the exposure operation B is completed, processing returns to step #43 (FIG. 4), live view display is resumed, and the operations described above are repeated.

Figure 7:
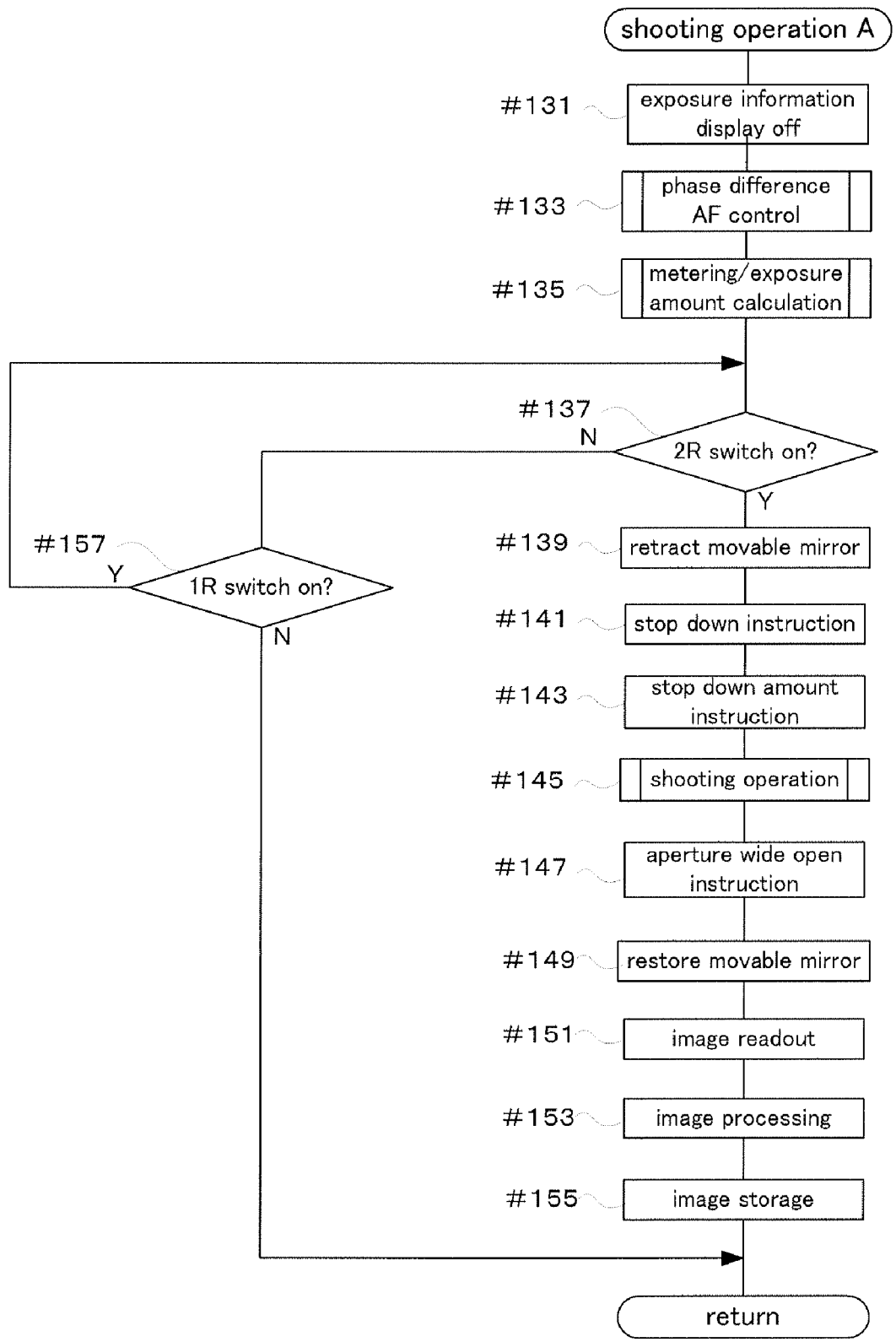
FIG. 7 is a flowchart showing a shooting operation A of one embodiment of the present invention.

Next, a sub-routine for the shooting operation A of step #37 will be described using FIG. 7. This shooting operation A is a subroutine executed when the release button 21 has been pressed down halfway in the normal optical viewfinder viewing state (that is, non-live view display). If the shooting operation A subroutine is entered, first of all exposure information display is turned off (#131).

Next, similarly to step #121, the phase difference AF control subroutine is executed (#133). Specifically, defocus direction and defocus amount are obtained based on output of the phase difference AF sensor 243, and focusing of the photographing optical system 101 is carried out. This subroutine will be described in detail later using FIG. 9.

If phase difference AF is completed, then similarly to step #11 photometry and exposure value calculation are carried out, and exposure control values such as shutter speed and aperture value are obtained (#135). Next it is determined whether or not the shutter button 21 has been pressed down fully, that is, if the 2R switch is on (#137). If the result of determination is that the 2R switch is not on, it is then determined whether or not the 1R switch is on (#157).

If the result of this determination is that the 1R switch is not on, the shooting operation A is terminated and the original routine is returned to. On the other hand, if the result of determination is that the 1R switch is on, step #137 is returned to, and a standby state is entered where the states of the 1R switch and the 2R switch are mutually detected.

If the result of determination in step #137 is that the 2R switch is on, processing transfers to a step for performing exposure. First a retraction operation for the movable mirror 201 (moving to the raised position) is carried out (#139). As a result, subject light flux is guided to the image sensor 221 by the photographing optical system 101. Next, a stopping down operation is instructed to the lens CPU 111 (#141) and a stopping down amount is also instructed (#143).

As a result, it is possible to prepare entry to the shooting operation, and so a shooting operation is started (#145). Exposure is the starting of travel of the front curtain of the shutter 213, together with charge accumulation of the image sensor 221. If a time corresponding to the shutter speed acquired in step #135 or a shutter speed that was manually set by the photographer has elapsed, travel of the rear curtain of the shutter 213 starts, and charge accumulation of the image sensor 221 is terminated.

If the shooting operation is completed, an instruction to fully open the aperture is output to the lens CPU 111 (#147). Next, a restore operation of the movable mirror to the lowered position is carried out (#149), and image signals are read out from the image sensor 221 (#151). Image processing of the read out image signals is carried out by the image processing circuit 257 etc. (#153), and the processed image data is stored in the storage medium 227 (#155). Once image storing is finished, the original routine is returned to.

Next, a sub-routine for the shooting operation B of step #125 (FIG. 6) will be described using FIG. 8. This shooting operation B is a subroutine executed in the event that the release button 21 is pressed down fully in the live view display state. If the subroutine for shooting operation B is entered, exposure values are calculated based on output of the AE circuit 255 (#161).

Next, similarly to steps #141 and #143, a stopping down instruction and a stopping down amount instruction are issued (#163 and #165). Then, similarly to step #145, a shooting operation is carried out (#167), and as a result image data of the subject image is acquired based on output of the image sensor 221. After that, similarly to steps #147, #151, #153 and #155, full opening of the aperture is instructed (#169), image signals are read out (#171), image processing is carried out (#173) and processed signal are stored in the storage medium 277 (#175). Once image storing is finished, the original routine is returned to.

Next, a sub-routine for phase difference AF control of step #121 (FIG. 6) and step #133 (FIG. 7) will be described using FIG. 9. This phase difference AF control is for obtaining defocus direction and defocus amount of the photographing optical system 101 with a well known phase difference method, using two peripheral light fluxes of the photographing optical system 101. It is possible to carry out high precision AF.

If the phase difference AF control subroutine is entered, first, all point focus detection is carried out (#181). Specifically, defocus direction and defocus amount are detected for all points where detection is possible using the phase difference AF sensor 243 and the phase difference AF processing circuit 245. Next, a point that is at the closest distance is selected from among all the detected points (#183). Generally, the main subject is most often that which is the closest subject, and selection is carried out to this end.

Next, it is determined whether or not a focus range has been entered into based on defocus amount of the selected closest point (#185). A determination reference for whether or not the focus range is entered is determination as to whether or not the defocus amount has come within a focus tolerance value based on a permissible circle of confusion. If the result of determination is that it is within a focus range, the original routine is returned to. This permissible circle of confusion is set in accordance with the imaging resolution of the image sensor 221, in other words, the sensor size of the image sensor 221.

On the other hand, if the result of determination is that it is not within a focusing range, drive direction and drive amount for driving the photographing optical system 101 using the optical system drive mechanism 107 are calculated based on defocus direction and defocus amount for the selected focus detection point (#187). Lens drive control for the optical system drive mechanism 107 is then instructed to the lens CPU 111 (#189), and the lens drive amount and drive direction at that time are instructed (#191).

If a lens drive control instruction is output to the lens CPU 111, the body CPU 251 awaits input of a signal indicating lens drive completion from the lens CPU 111 (#193). If lens drive is completed, focus detection is carried out for the focus detection point selected in step #183 (#195). If focus detection is completed, processing returns to step #185 and the steps described above are repeated until a focus range is entered.

Figure 10:
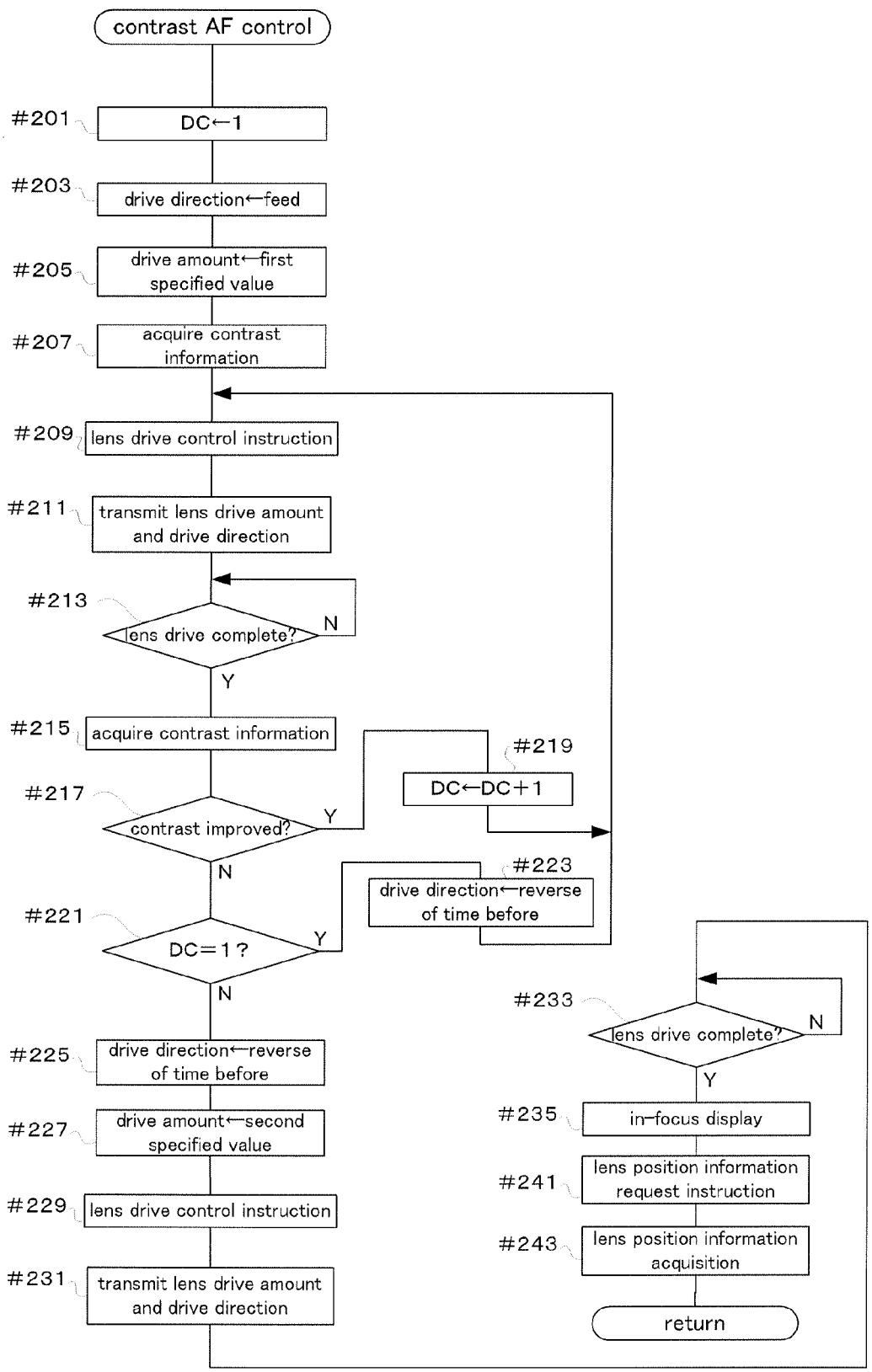
FIG. 10 is a flowchart showing contrast AF control of one embodiment of the present invention.

Next, a sub-routine for contrast AF control of step #105 (FIG. 6) will be described using FIG. 10. This contrast AF control is performing drive of the photographing optical system 101 so that contrast information of the contrast AF circuit 253 becomes maximum based on output of the image sensor 221. This contrast AF control can be used when the movable mirror 201 is at the retracted position (raised up position) and it is not possible to perform phase difference AF control based on output of the phase difference AF sensor 243.

If the contrast AF control subroutine is entered, first of all a register DC is set to 1 (#201). This register DC is a register that is used in order to determine drive direction for the lens drive. Next, the lens feed direction is set as the drive direction (#203). A first specified value is then set as a lens drive amount (#205). This first specified value is equivalent to feed amount (operation amount) LD1 of the focus lens inside the photographing optical system 101 in FIG. 14.

Next, contrast information is acquired from the contrast AF circuit 253 (#207). Lens drive control is then instructed to the lens CPU 111 (#209), and the lens drive amount and drive direction that were set in steps #203 and #205 are transmitted (#211). If these signals are transmitted, the lens CPU 111 drives the photographing optical system 101 using the optical system drive mechanism 107. If drive control based on the set drive direction and drive amount is completed, the lens CPU 111 transmits a lens drive completion signal to the body CPU 251.

The body CPU 251 awaits receipt of the lens drive completion signal (#213), and upon receipt acquires newest contrast information from the contrast AF circuit 253 (#215). Next, it is determined whether or not contrast has improved compared to the previous time (#217). If the result of determination is that the contrast this time has improved, 1 is added to the register DC (#219), processing returns to step #209, and the previously described steps are repeated.

If the result of determination in #217 is that the contrast is lower than the time before, it is determined whether or not the value of the register DC is 1 (#221). If the result of determination is that the register DC is 1, the lens drive direction is reversed from that the time before (#223), processing returns to step #209, and the previously described steps are repeated.

Specifically, when first driving the lens, the lens is driven in a drive direction that was set in step #203. If the result of driving is that contrast is improved, the drive direction is correct (approaching the focus position) while if contrast is lowered the drive direction is backwards (moving away from the focus position) and so the drive direction is reversed. Accordingly, if the register DC is 1 it is determined to be the initial drive direction and processing advances to step #223 where the drive direction is reversed, while if the register DC is not 1 it is determined that contrast has reached a peak position and processing advances to step #225.

If the result of determination in step #221 is that register DC is not 1, the lens has been driven in a direction that improves contrast, but since it is lowered here it is determined that the peak contrast position has been passed, and the drive direction is made opposite to that the time before (#225). A second specified value is then set as a lens drive amount (#227).

Figure 14:
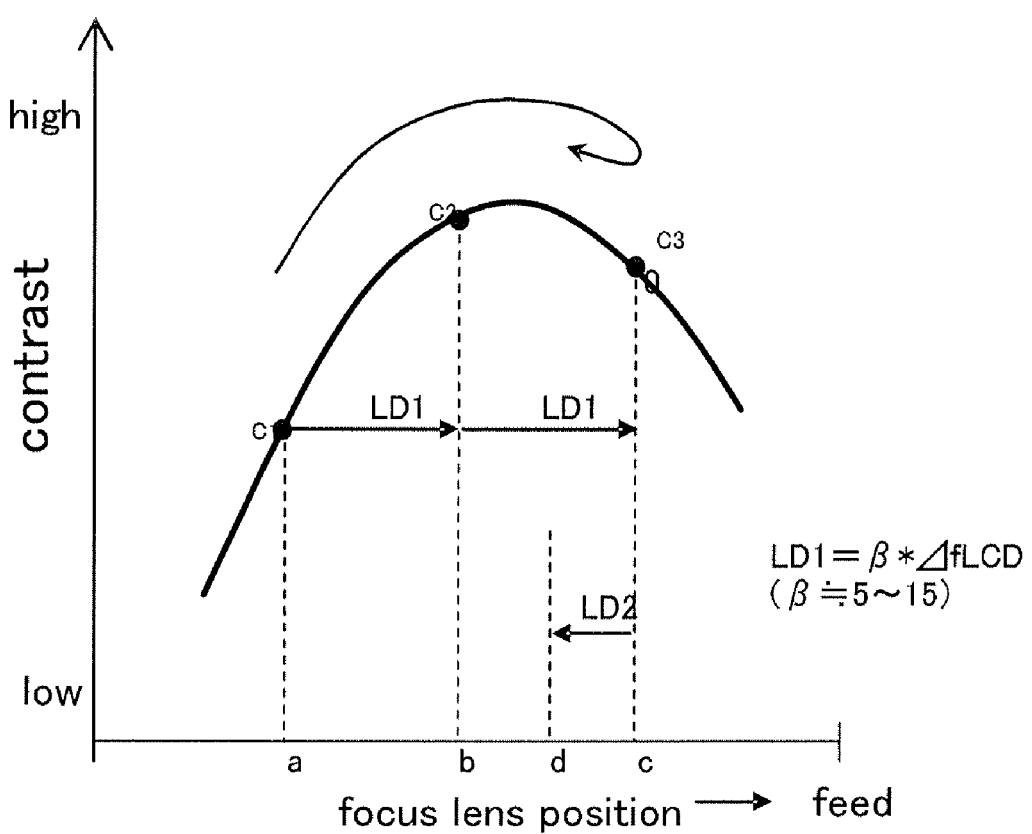
FIG. 14 is a drawing showing a relationship between contrast information and focus lens drive for one embodiment of the present invention.

The second specified value LD2 for the lens drive amount is equivalent to half the feed amount LD1 of the focus lens, as shown in FIG. 14. Since the peak contrast position has been passed, it is assumed that the peak position is somewhere between this time and the previous time, and the first specified value is halved. Lens drive control is then instructed to the lens CPU 111 (#229), and the lens drive amount and drive direction that were set in steps #225 and #227 are transmitted (#231).

Upon receipt of the lens drive control instruction etc, the lens CPU 111 commences drive control for the optical system drive mechanism 107, and once drive is performed by a drive amount based on the second specified value a lens drive completion signal is transmitted to the body CPU 251. The body CPU 251 awaits receipt of the lens drive completion signal (#233), and if this completion signal is received in-focus display is carried out (#235). This is display of in-focus display 311 on the display screen of the liquid crystal monitor 26, as shown in FIG. 13.

A lens position information request is then instructed to the lens CPU 111 (#241). The lens CPU 111 acquires lens position information from the optical system position detection mechanism 105, and transmits this information to the body CPU 251. The body CPU 251 acquires the transmitted lens position information (#243). After that, step #107 of FIG. 6 is returned to, and if specified conditions are satisfied, after carrying out focus control by phase difference AF in step #121 the shooting operation B of step #125 is carried out. The acquisition of lens position information in steps #241 and #243 is in order to determine whether or not a phase difference AF not required condition in step #115 is met.

Within this embodiment, in the event that a peak position of contrast is passed, the drive amount is halved and drive performed in the opposite direction (#225, #227), but this is not limiting and it is also possible, for example, to cause drive to a peak contrast position by interpolation calculation such as three-point interpolation method.

Figure 11:
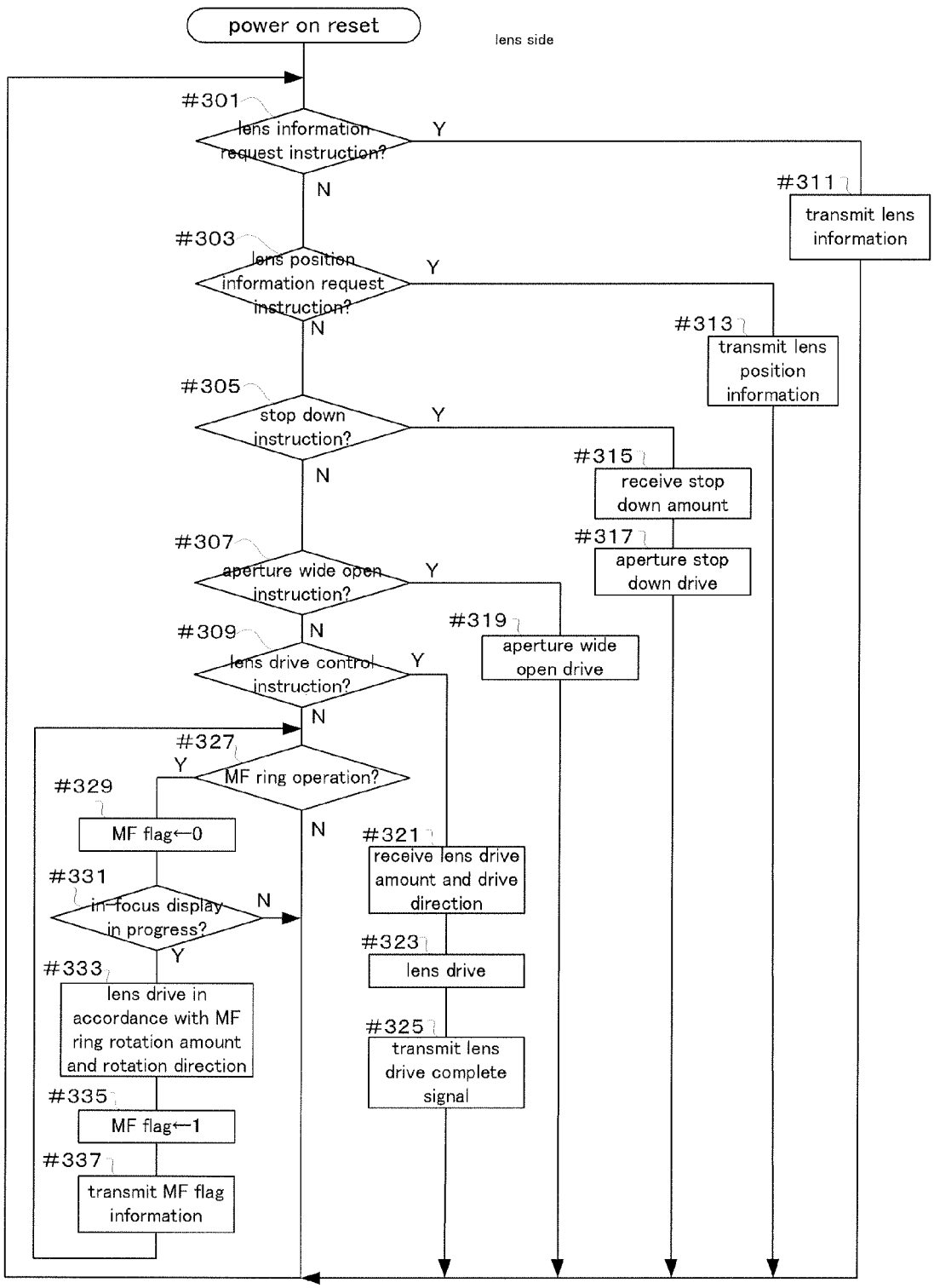
FIG. 11 is a flowchart showing a power-on reset operation, in an interchangeable lens, of one embodiment of the present invention.

Next, operations by the lens CPU 111 of an interchangeable lens 100 will be described using FIG. 11. First, it is determined whether or not a lens information request instruction has been issued from the body CPU 251 (#301). If the result of determination is that there is a request instruction, the lens information is transmitted (#311). As the lens information here, there is maximum aperture value, lens color balance information, aberration information, information for AF, type of lens (such as macro lens) lens specific information etc., and information stored inside the lens CPU 111 or in a not shown electrically rewritable memory such as EEPROM If the result of determination in #301 is that there is no lens information request instruction, it is determined whether or not there is a lens position information request (#303). If the result of determination is that there is a position information request, the lens position information is transmitted to the body CPU (#313). The lens position information is detected by the optical system position detection mechanism 105, and so this information is transmitted.

If the result of determination in #303 is that there is no position information request instruction, it is determined whether or not there is a stop down instruction (#305). If the result of determination is that there is a stop down instruction, the aperture value transmitted from the body CPU 251 is received (#315). Once the aperture value is received, control of stop down drive of the aperture 103, carried out by the aperture drive mechanism 109, is carried out (#317).

If the result of determination in #305 is that there is no stop down instruction, it is determined whether or not there is an aperture wide open instruction (#307). If the result of determination is that there is an aperture wide open command, control of wide open drive of the aperture 103, carried out by the aperture drive mechanism 109, is carried out (#319).

If the result of determination in #307 is that there is no wide open instruction, it is determined whether or not there is lens drive control instruction (#309). If the result of determination is that there is a lens drive control instruction, a transmitted lens drive amount and drive direction are received (#321). Once the lens drive amount and drive direction are received, the lens CPU 111 controls the optical system drive mechanism 107 to carry out drive control of the photographing optical system 101 (#323). Then, if a specified drive amount is driven, a lens drive completion signal is transmitted to the body CPU 251 (#325).

If the result of determination in step #309 is that a lens drive control instruction has been issued, then at the time of i-AF+MF mode it is determined whether or not the M focus ring 11 has been operated (#327). If the result of determination is that the M focus ring 11 has been operated, the MF flag is set to 0 (#329). Next, it is determined whether or not in-focus display is in progress (#331). Here, communication with the body CPU 251 is performed, and it is determined whether or not a focus state is reached in contrast AF control and in-focus display is active (refer to #235 and FIG. 13).

If the result of determination in step #331 is that the in-focus display is not active, processing returns to step #301 and the operations described above are repeated. On the other hand, if in-focus display is active, rotation amount and rotation direction of the M focus ring 11 are detected by the power focus detection mechanism 106, and the photographing optical system 101 is driven by the optical system drive mechanism 107 according to the results of detection. Next, the MF flag is set to 1 (#335), and this MF flag information is transmitted to the body CPU 251 (337).

In this way, with power focus of this embodiment, if a focused state is reached using contrast AF (#235, #331) power focus of the photographing optical system using power focus detection mechanism 106 becomes possible (#333), and once drive according to rotation of the M focus ring 11 is completed the MF flag is set to 1 (#335). If this MF flag is set to 1, contrast AF control being performed again is stopped (Y at #102, and there is no transition to #105).

Also, in the event that the release button 21 has been pressed down fully, if the MF flag is set to 1 (branch to Y in #113), a transition is made to the shooting operation (#125) without performing phase difference AF control (#121 is skipped). This is because since a tentative focused state has been reached using contrast AF, and fine focus adjustment is carried out by manual focus adjustment by the photographer, a further focus adjustment operation using phase difference AF is not required. It is therefore possible to reduce the time required for the phase difference AF.

Also, within this embodiment, after carrying out the contrast AF in step #105, phase difference AF is carried out in step #121. With contrast AF at least focus adjustment that is of a specified focus precision is carried out, and as well as this, in step #121 high precision phase difference AF is carried out. Because a tentatively focused state is achieved using contrast AF, not a lot of time is taken from this focused state to completion of high precision focus adjustment, and as a result it is possible to perform focus adjustment with only a small time lag and with high precision.

Further, in step #115 in this embodiment phase difference AF not required conditions are determined, and if this not required condition is satisfied the phase difference AF of step #121 is omitted. It is therefore possible to reduce the time lag by the time required for the phase difference AF, and it is possible to carry out high precision focus adjustment. Within this embodiment there are three conditions that are determined to be phase difference AF not required conditions, but this is not limiting, and it is possible to add other conditions, and it is also possible to omit any of the conditions. In any event, even if high precision phase difference AF is not performed, as long as sufficient focus precision is obtained the phase difference AF can be omitted.

Further, in step #117 in this embodiment it is determined whether or not AF lock is active, and if AF lock is active the phase difference AF of step #121 is omitted. It is therefore possible to reduce time lag by the time required for the phase difference AF. In particular, if AF lock has been activated, the photographer has designated the focus position and it is often the case that a picture will be taken quickly, and it is possible to confirm at least a tentative focus precision. Within this embodiment, phase difference AF has been omitted in the event that the AF lock button 28 has been operated, but it is not limited to the AF lock button 28 and it is also possible to omit phase difference AF if another operation member is operated.

In this manner, with this embodiment, in a state where a manual focus adjustment operation is carried out in a live view display state, when the release button is pressed down fully and a shooting operation carried out, automatic focus adjustment is not carried out again. It is therefore possible to carry out the focus adjustment with a small time lag and to high precision.

With this embodiment, subject light flux is switched between a viewfinder optical system and an image sensor by moving a movable mirror 201 up and down, but this is not limiting, and it is also possible to divide subject light mirror by arranging a half-mirror. Also, focus precision using phase difference AF is made higher than at the time of in-focus display using contrast AF, but this is not limiting and it is also possible to make focusing precision for contrast AF the same higher precision as phase difference AF Further, the closest point is selected from among focus detection points, in the phase difference AF control subroutine (#183), but this is not limiting, and it is also possible to select intermediate values of a plurality of focus detection results, or to suitably process a plurality of focus detection results using evaluative calculation.

Also, with this embodiment, description has been given for an example where a single lens reflex is adopted as the digital camera, but the present invention camera can be applied to an image sensor unit of a digital camera or the like that performs live view display, and can perform automatic focus adjustment using contrast AF.

Description has been given above of one embodiment of the present invention, but the present invention is not limited to these embodiment, and structural elements may be modified in actual implementation within the scope of the gist of the embodiments. It is also possible form various inventions by suitably combining the plurality structural elements disclosed in the above describe embodiments. For example, it is possible to omit some of the structural elements shown in the embodiments.

What is claimed is:

1. An imaging device comprising:
 a photographing lens having a manual focus mechanism;
 an imaging unit for receiving subject light flux made incident by the photographing lens on an image forming surface, and subjecting the subject image formed on the imaging surface to photoelectric conversion to output image data;
 a display unit for carrying out a live view display operation using image data acquired by the imaging unit;
 a contrast auto focus (AF) unit for obtaining contrast information of the subject image from the image data acquired by the imaging unit, and guiding the photographing lens into a first specified focus permissible range based on the contrast information;
 a phase difference AF unit for causing a mirror member to be placed in an optical path of the photographing lens, receiving the subject light flux reflected by the mirror member and detecting a defocus amount of the photographing lens by a phase difference method, and guiding the photographing lens into a second specified focus permissible range according to the detection results;
 a release button having a two stage operating feature, of a half pressed operation and a fully pressed operation; and
 a control unit for controlling focusing of the imaging device so that, when the release button has been pressed down halfway during execution of the live view display operation, a focus adjustment operation using the contrast AF unit is executed, and after that when the release button has been pressed down fully, the focus adjustment operation using the phase difference AF unit is executed, and when the focus adjustment operation using the contrast AF unit is executed during execution of the live view display operation, if, after that, a manual focus operation follows, the focus adjustment operation using the contrast AF unit is not executed again, if, after that, the release button is pressed down fully, there is a transition to a shooting operation without executing the focus adjustment operation using the phase difference AF unit.

2. The imaging device of claim 1, wherein:
 the manual focus mechanism, of the photographing lens prohibits the manual focus operation until the photographing lens has been guided into the first specified focus permissible range by the contrast AF unit.

3. A control method for an imaging device for imaging a subject, the control method comprising:
 imaging a subject and outputting image data;
 subjecting a formed subject image to live view display;
 guiding a photographing lens to a first specified focus permissible range based on contrast information of the image data forming the subject image in response to an operation of pressing a release button halfway while live view display is in operation;
 guiding the photographing lens to a second specified focus permissible range based on a phase difference AF method in response to an operation of pressing the release button down fully;
 after the photographing lens is guided to the first specified focus permissible range based on the contrast information of the image data forming the subject image in response to an operation of pressing the release button halfway while the live view display is in operation, prohibiting a focus adjustment operation to guide the photographing lens to the first specified focus permissible range based on the contrast information of the subject image when a manual focus operation of the photographing lens has been carried out; and
 carrying, out an imaging operation without the focus adjustment operation to guide the photographing lens to the second specified focus permissible range based on the phase difference AF method in response to an operation of the release button being pressed down fully.

4. The control method for the imaging device of claim 3, wherein:
 the manual focus operation of the photographing lens is prohibited until the photographing lens is guided into the first specified focus permissible range based on the contrast information of the image data by imaging the subject image.

5. A computer readable storage medium storing a program for executing the following functions, comprising:
 forming a subject image and outputting image data;
 subjecting the formed subject image to live view display;

guiding a photographing lens to a first specified focus permissible range based on contrast information of the image data forming the subject image in response to a release button being pressed down halfway while the live view display is in operation;

guiding the photographing lens to a second specified focus permissible range based on a phase difference AF method in response to an operation of pressing the release button down fully;

after the photographing lens is guided to the first specified focus permissible range based on the contrast information of the image data forming the subject image in response to an operation of pressing the release button halfway while the live view display is in operation, prohibiting a focus adjustment operation to guide the photographing lens to the first specified focus permissible range based on the contrast information of the subject image when a manual focus operation of the photographing lens has been carried out; and carrying out an imaging operation without the focus adjustment operation to guide the photographing lens to the second specified focus permissible range based on the phase difference AF method in response to an operation of pressing the release button being pressed down fully.

6. The computer readable storage storing the program of claim 5, wherein the program prohibits the manual focus operation of the photographing lens until the photographing lens is guided into the first specified focus permissible range based on the contrast information of the image data by imaging the subject image.

* * * * *